United States Patent [19]

Nishimura et al.

[11] 3,835,405

[45] Sept. 10, 1974

[54] FM DEMODULATION SYSTEM

[75] Inventors: Katsutoshi Nishimura, Osaka; Kiyoji Fujisawa, Nara; Toshikazu Yosumi, Osaka, all of Japan

[73] Assignee: Matsushita Electric Industrial Co. Ltd., Osaka, Japan

[22] Filed: July 16, 1973

[21] Appl. No.: 379,338

[52] U.S. Cl. .................. 329/126, 325/348, 329/131, 329/136

[51] Int. Cl. .............................................. H03d 3/18

[58] Field of Search .................... 329/126, 131–136; 325/347, 348, 326, 402, 456, 478, 477

[56] References Cited

UNITED STATES PATENTS

| | | | |
|---|---|---|---|
| 3,188,571 | 6/1965 | Michael | 325/348 X |
| 3,339,144 | 8/1967 | Squires | 325/402 X |
| 3,569,840 | 3/1971 | Tanaka et al. | 325/478 X |
| 3,609,563 | 9/1971 | Zinn | 329/126 |
| 3,638,128 | 1/1972 | Downs | 329/126 |

*Primary Examiner*—Alfred L. Brody

*Attorney, Agent, or Firm*—Wenderoth, Lind & Ponack

[57] ABSTRACT

An FM demodulation system has a limiter, a frequency doubler, a sawtooth-wave generator, a low-pass filter, an amplitude selector and a noise suppressing circuit. The output voltage of the sawtooth-wave generator is proportional to the frequency deviation of the FM signal and becomes large when a noise occurs. During the occurrence of noise, the amplitude selector which is coupled to the output of the sawtooth-wave generator generates a signal for controlling the characteristics of the signal path in the noise suppressing circuit, so that a noise component does not appear at the signal output terminal.

3 Claims, 16 Drawing Figures

FM DEMODULATION SYSTEM

BACKGROUND OF THE INVENTION

1. Field of the Invention

This invention relates generally to systems for demodulating frequency modulated signals, and more particularly to FM demodulation systems provided with noise suppression properties for audio applications.

2. Description of the Prior Art

An FM demodulation system is often employed in a tape recorder, an FM receiver, a television receiver, etc. In the conventional FM demodulation system, an impulsive noise is apt to appear in the output signal when a dropout of the carrier occurs or an external noise is received. It is well known that a noise which occurs during the absence of a signal can be eliminated by means of a muting circuit, but the common muting circuit can not usually eliminate the impulsive noise which occurs where the received signal partly disappears due to the so-called "dropout of carrier." There have been employed various methods for suppressing the impulsive niose. However, these methods have the disadvantage that they require a complicated circuit arrangement, and they are also disadvantageous because of their high cost.

BRIEF SUMMARY OF THE INVENTION

Therefore, an object of the present invention is to provide a novel and improved FM demodulation system.

A further object of this invention is to provide a novel FM demodulation system for demodulating a signal without noise generation due to carrier dropout or receipt of an external noise.

Another object of this invention is to provide a system for demodulating frequency modulation signals, which is suitable for applying to a tape recorder, a FM receiver, an television receiver, an audio system, etc., for a domestic use.

These objects are achieved by providing a system for demodulating the frequency modulation signals according to the present invention, which comprises a limiter to which a frequency modulated signal is applied and which eliminates amplitude variation in the input frequency modulated signal, a frequency doubler which is coupled to the output of said limiter and which alters the amplitude limited signal supplied from said limiter to a pulse-train having a frequency which is equal to twice the frequency of said limiter output signal, a sawtooth-waveform generator which is coupled to the output of said frequency doubler and which generates a signal having a sawtooth-wavefrom, the amplitude of which is proportional to the time intervals of the pulses of said pulse-train, a low-pass filter which is coupled to the output of said sawtooth-waveform generator and which produces an information signal contained in said sawtooth-waveform signal, an amplitude selector which is coupled to the output of said sawtooth-waveform generator and which produces an output signal when the amplitude of said sawtooth waveform output exceeds a predetermined level, and a noise suppressing circuit which has a first terminal coupled to the output of said low-pass filter and a second terminal coupled to the output of said amplitude selector and a third terminal at which appears a demodulated output signal the characteristic of which are controlled by the application of the selected output from said amplitude selector so that a noise component does not appear at said third terminal.

BRIEF DESCRIPTION OF THE DRAWINGS

These and other objects of the invention will be apparent from a consideration of the following detailed description with reference to the accompanied drawings, wherein.

DETAILED DESCRIPTION OF THE EMBODIMENT

Figure 1:
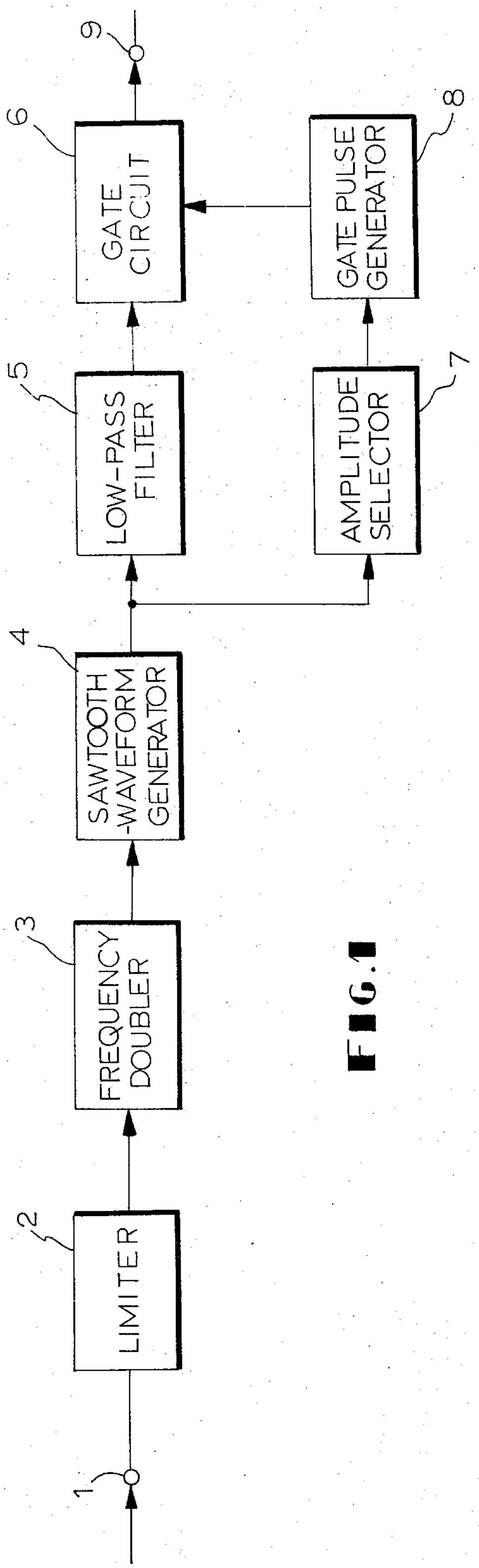
FIG. 1 is a block diagram of a preferred embodiment of the present invention.
Figure 2A:
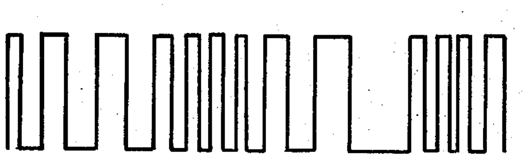
FIGS. 2A–2H show the signal waveforms occuring at different points during the operation of the circuit shown in FIG. 1.
Figures 2B, 2C, 2D, 2E, 2F, 2G, 2H:
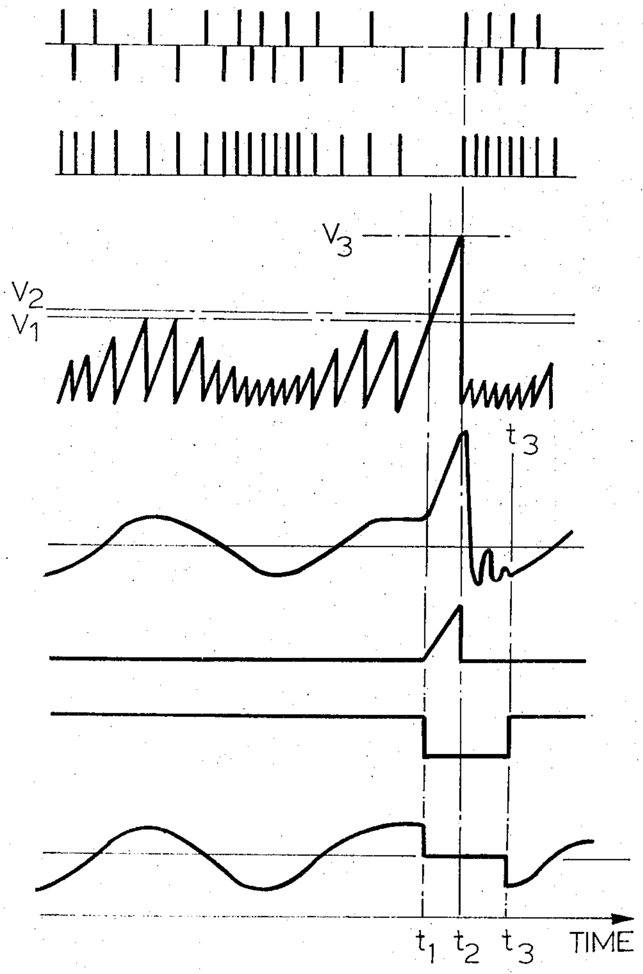

In FIG. 1, a terminal designated by a reference numeral 1 is an input terminal at which a frequency modulated signal to be demodulated is applied. A block 2 represents a limiter which is connected to the input terminal 1 and eliminates the amplitude variation in the input frequency modulated signal. A block 3 represents a frequency doubler which is connected to the output of the limiter 2 and alters the amplitude limited signal supplied from the limiter 2 into a pulse-train having a frequency which is equal to twice the frequency of the limiter output signal. A block 4 represents a sawtooth-waveform generator which is connected to the output of the frequency doubler 3 and generates a signal having a sawtooth-waveform. The rise portion of the voltage of the sawtooth-waveform is linearly proportional to time and the restoration or "flyback" portion of the waveform is produced by the application of a pulse in the pulse train from the frequency doubler 3. A block 5 represents a low-pass filter to obtain, from the sawtooth-waveform output of the sawtooth-waveform generator 4, an information signal contained therein. A block 6 represents a gate circuit which has a signal input terminal connected to the output of the low-pass filter 5 and a control terminal to which a gate pulse for controlling the operation of the gate circuit is applied. The gate circuit 6 operates to prevent the information signal applied at the input terminal from passing to an output terminal 9. A block 7 represents an amplitude selector which operates to pass a portion, which exceeds a limit level, of the input sawtooth-waveform signal to the output terminal thereof. A block 8 represents a gate pulse generator which generates a gate pulse having a suitable pulse-width in accordance with the signal passing the amplitude selector 7, and the thus generated gate pulse is applied to the control terminal of the gate circuit. The signal waveforms at the different points of the circuit of FIG. 1 are shown in FIG. 2. The length of time from $t_1$ to $t_2$ of FIG. 2 is the time during which a drop out of the carrier or the reception of impulsive noise occurs.

Referring to FIGS. 1 and 2, the operation of this embodiment of the invention will be explained. The frequency modulated signal applied at the input terminal 1 is amplified and the amplitude variation thereof is eliminated by the limiter 2. Now, it is assumed that the resulting limiter output signal has a rectangular waveform, as shown in part A of FIG. 2. This signal is applied to the frequency doubler 3. The operation of the frequency doubler 3 as described above is achieved by using a circuit arrangement which comprises an RC differentiating circuit and a full-wave rectifier.

That is, the differentiating circuit changes the rectangular wave signal into a pulse train having both positive and negative polarities as shown in part B of FIG. 2. The full-wave rectifier rectifies the pulse train having both polarities and results in a pulse train having only one polarity, as shown in part C of FIG. 2. The frequency of this pulse train is equal to twice the frequency of the carrier of the input frequency modulated signal. This pulse train is applied to the sawtooth-waveform generator 4. The restoration or "flyback" of the output wave of the sawtooth-waveform generator 4 is produced by the application of each pulse of the pulse train and the voltages during the intervals between successive pulses are proportional to the input pulse intervals, as shown in part D of FIG. 2.

If the amplitude of the sawtooth-waveform output is designed so as to just reach the level $V_1$ shown in part D of FIG. 2 when the frequency deviation of the frequency modulated signal reaches a maximum in the negative direction, the portions of the sawtooth-waveform output, the amplitude of which are larger than level $V_1$, are representative of a condition such as noise generation. In the example of FIG. 2, the height of the sawtooth-waveform reaches a higher level as shown by level $V_3$. This sawtooth-waveform signal is fed to the low-pass filter 5. The waveform shown in part E of FIG. 2 is the output waveform of the low-pass filter 5, in which a large noise component appears during the time interval from $t_1$ to $t_2$.

On the other hand, the output of the sawtooth-waveform generator 4 is also applied to the amplitude selector 7. The amplitude selector 7 operates in such a way as to pass to its output terminal a portion, which exceeds a limit level $V_2$, of the input sawtooth-waveform signal, as shown in part F of FIG. 2. This limit level $V_2$ is placed at a slightly higher level than the level $V_1$, as shown in part D of FIG. 2. The time during which a signal appears at the output of the amplitude selector 7 corresponds to a time duration of the time during which the noise occurs.

Consequently, if the gate circuit is closed during this time duration, no noise appears at the output terminal 9. Since the output signal of amplitude selector 7 appears during noise generation, the output pulse of gate pulse generator 8 is also generated during noise generation. That is, the duration of time during which the gate circuit 6 is controlled always coincides with the duration of the noise. Therefore, the noise is prevented from passing to the output terminal 9. However, there is a transient signal due to the characteristics of the low-pass filter 5. Because of this, until the time at which the transient signal ceases, it is desirable that the signal blocking action of the gate circuit 6 should be continued for completely eliminating output noise. Part G of FIG. 2 shows a gate pulse waveform which is necessary to achieve this effect. This waveform is obtained by including in the gate pulse generator 8 a monostable multivibrator which is triggered by the trailing edge of the output pulse of the amplitude selector 7 and generates a pulse having a pulse-width corresponding to the time interval ($t_2 \sim t_3$) which corresponds to the transient signal time.

In practice, the output of the system has very small remaining noise components because of the time lag in the gate function and the difference between levels $V_1$ and $V_2$. The problem caused by the remaining noise components is usually negligible. However, if necessary, by delaying the signal application to the gate circuit 6 by inserting a delay circuit in a pre-stage of the gate circuit 6, it is also possible to remove the remaining noise from the output.

In the case where a carrier dropout occurs for a long time since the output of sawtooth-waveform generator 4 has a level exceeding the level $V_2$, the circuit still produces zero output. Therefore, the noise does not appear at the output terminal 9. That is, this system according to the invention is also capable of performing a common muting action.

Figure 3:
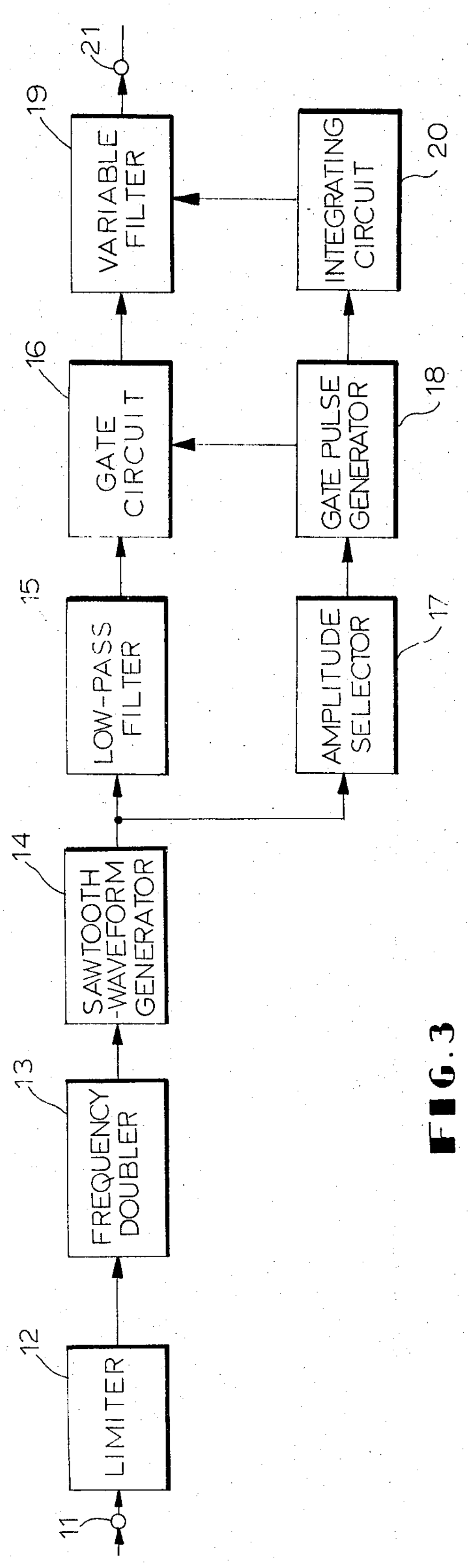
FIG. 3 is a block diagram of another preferred embodiment of the present invention.
Figures 4A, 4B, 4C, 4D, 4E:
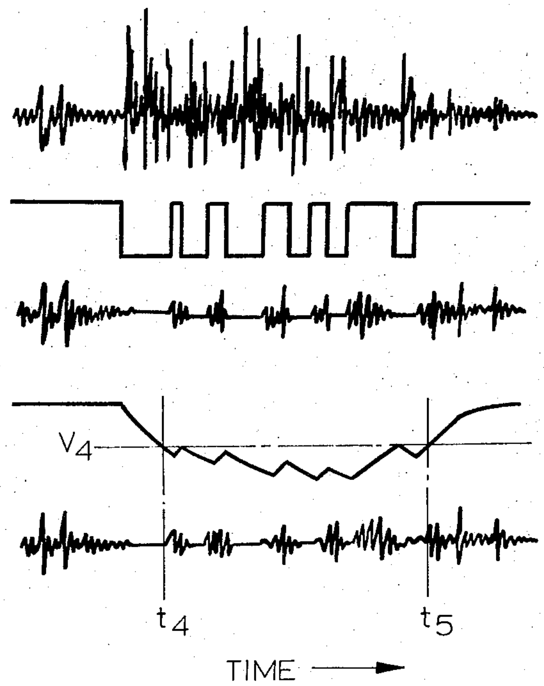
FIGS. 4A–4E show the signal waveforms for the embodiment having a variable filter in FIG. 3.
Figure 5:
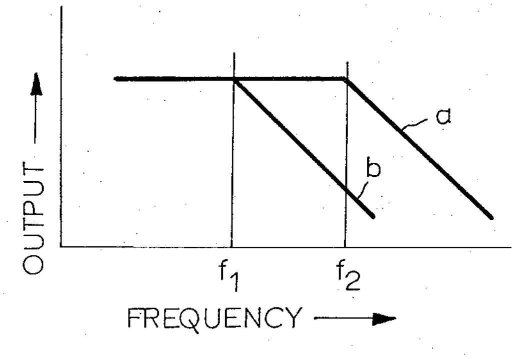
FIG. 5 shows the frequency characteristics of the variable filter in FIG. 3.

FIG. 3 shows another embodiment of the present invention, and FIG. 2 also illustrates the waveforms occurring at the different points the circuit shown in FIG. 3 which correspond to like points in FIG. 1. FIG. 4 shows waveforms at various other points in the embodiment shown a diagrammatic view illustrating an operation of a variable filter in FIG. 3. FIG. 5 shows the frequency characteristics of the variable filter in FIG. 3.

In FIG. 3, the terminal 11 is an input terminal at which a frequency modulated signal to be demodulated is applied. A block 12 represents a limiter which is connected to the input terminal 11 and which eliminates the amplitude variation in the input frequency modulated signal. A block 13 represents a frequency doubler which is connected to the output of the limiter 12 and which changes the amplitude limited signal supplied from the limiter 12 into a pulse-train having a frequency which is equal to twice the frequency of the limiter output signal. A block 14 represents a sawtooth-waveform generator which is connected to the output of the frequency doubler 13 and which generates a signal having a sawtooth-waveform, a rise portion of the voltage of which is linearly proportional to time and the restoration or "flyback" portion of which is produced by the application of the pulses in the pulse trains from the frequency doubler 13. A block 15 represents a low-pass filter to obtain, from the sawtooth-waveform output of the sawtooth-waveform generator 14, an information signal which is contained therein. A block 16 represents a gate circuit which has a signal input terminal connected to the output of the low-pass filter 15 and a control terminal to which a gate pulse for controlling the operation of the gate circuit is applied. The gate circuit 16 operates to prevent the information signal applied at the input terminal from passing to the output terminal thereof. A block 17 represents an amplitude selector which operates to pass a portion of the input sawtooth-waveform signal which a limit level to the output terminal thereof. A block 18 represents a gate pulse generator which generates a gate pulse having a suitable pulse-width in accordance with the signal passed by the amplitude selector 17, the thus generated gate pulse being applied to the control terminal of the gate circuit 16.

A block 19 represents a variable filter which has a signal input terminal connected to the output of the gate circuit 16 and a control terminal to which a switching pulse for controlling the cut off frequency thereof is applied. The cutoff frequency of the variable filter 19 is normally a high frequency such as a cutoff frequency which does not influence the information signal from the gate circuit 16. When excessive noise occurs, however, the cutoff frequency is changed into a lower frequency within an audio frequency band by the application of the switching pulse to the control terminal. A block 20 represents an integrating circuit which integrates the gate pulses from the gate pulse generator 18 and generates a switching pulse when the integrated voltage reaches a predetermined value. A terminal 21 connected to the variable filter is an output terminal at which appears the demodulated output.

Referring to FIGS. 2 to 5, the operation of this embodiment of this invention will be explained. The frequency modulated signal applied at the input terminal 11 is amplified and the amplitude variation thereof is limited by the limiter 12. Now, it is assumed that resulting limiter output signal of the limiter has a rectangular waveform as shown in part A of FIG. 2. This signal is applied to the frequency doubler 13. The operation of the frequency doubler such as described above is accomplished by using a circuit which comprises an RC differentiating circuit and a full-wave rectifier.

This differentiating circuit changes the rectangular wave into a pulse train having both positive and negative polarities as shown in part B of FIG. 2. The full-wave rectifier rectifies this pulse train and produces a pulse train having only one polarity as shown in part C of FIG. 2. The frequency of this pulse train is twice the frequency of the carrier of the input frequency modulated signal. This pulse train is applied to the sawtooth-waveform generator 14 to trigger it. The restoration or "flyback" of the output wave of the sawtooth-waveform generator 14 is produced by the application of the successive pulses of the pulse train and the voltage during the intervals between successive pulses is proportional to the input pulse intervals, as shown in part D of FIG. 2. If the amplitude of the sawtooth-waveform output is designed so as to just reach the level $V_1$ shown in part D of FIG. 2 when the frequency deviation of the frequency modulated signal reaches a maximum in a negative direction, the portions of the sawtooth-waveform output, the amplitude of which are larger than the level $V_1$, are representative of a condition such as noise generation. In the example of FIG. 2, the height of the sawtooth-waveform reaches higher level as shown by level $V_3$. This sawtooth-waveform signal is fed to the low-pass filter 15. The waveform shown in part E of FIG. 2 is the output waveform of the low-pass filter 15, in which a large noise component appears during the time interval from $t_1$ to $t_2$.

On the other hand, the output of the sawtooth-waveform generator 14 is also applied to the amplitude selector 17. The amplitude selector 17 operates in such a way as to pass to its output terminal a portion, which exceeds a limit level $V_2$, of the input sawtooth-waveform signal, as shown in part F of FIG. 2. This limit level $V_2$ is placed at a slightly higher level than the level $V_1$, as shown in part D of FIG. 1. The time during which a signal appears at the output of the amplitude selector 17 corresponds to the duration of the time during which the noise occurs.

Consequently, if the gate circuit is closed during this time duration, no noise appears at the output terminal. Since the output signal of the amplitude selector 17 appears during noise generation, the output pulse of gate pulse generator 18 is also generated during noise generation. That is, the duration of time during which the gate circuit 16 is controlled always coincides with the duration of the noise. Therefore, the noise is prevented from passing to the output terminal through the variable filter 19. However, there is a transient signal due to the characteristics of the low-pass filter 15. Because of this, until the time at which the transient signal ceases, it is desirable that the signal blocking action of the gate circuit 16 should be continued for completely eliminating output noise. Part G of FIG. 2 shows a gate pulse waveform which is necessary to achieve this effect. This waveform is obtained by including in the gate pulse generator 18 a monostable multivibrator which is triggered by the trailing edge of the output pulse of the amplitude selector 17 and generates a pulse having a pulse-width corresponding, for example, to the time interval $t_2$ to $t_3$ of FIG. 2 which corresponds to the transient signal time.

In practice, the output of the system has very small remaining noise components because of the time lag in the gate function and the difference between levels $V_1$ and $V_2$. The problem caused by the remaining noise components is usually negligible. However, if necessary, by using a delay circuit as described in the explanation of FIG. 1, it is also possible to remove the remaining noise components from the output.

Now, it is assumed that the excessive noise generation occurs as shown in part A of FIG. 4 which illustrates the output waveform of the low-pass filter 15. In the case, such a gate pulse from the gate pulse generator 18 is frequently generated as shown in part B of FIG. 4. Consequently, the output of the gate circuit 16 has a waveform as shown in part C of FIG. 4. Since this waveform has a large portion from which the noise components are removed, the audible output becomes unnatural.

The integrating circuit 20 in this embodiment produces a voltage as shown in part D of FIG. 4 by the integration of the gate pulses and generates a switching pulse when the integrated voltage exceeds the level $V_4$. The thus generated switching pulse is applied to the control terminal of the variable filter 19 and, then the cutoff frequency of the variable filter 19 is switched from the first frequency $f_2$ to the second frequency $f_1$. The first frequency $f_2$ is a higher frequency such as a cutoff frequency which does not influence the information signal and the second frequency $f_1$ is a lower frequency within the audio frequency band. The curve (*a*) of FIG. 5 illustrates the frequency characteristic of the variable filter 19 having the first cutoff frequency $f_2$, and the curve (*b*) illustrates the frequency characteristic of the filter 19 having the second cutoff frequency $f_1$. Therefore, during the period of excessive noise generation ($t_4 \sim t_5$), an output signal having a waveform filtered as shown in part E of FIG. 4 appears at the output terminal 21, and accordingly the unnatural audible output is reduced.

In the case where a long time dropout has occurred, the gate circuit 16 does not pass the noise as described in connection with gate circuit 6 of FIG. 1. Therefore, this circuit of FIG. 3 is also capable of performing a common muting action.

In the above explanation, although the actual circuits used in some stages are not shown, it is evident that they are various well-known types of circuits.

There has been described hereinbefore the preferred embodiments of the invention, and it is apparent that various modifications may be made without departing from the spirit and scope of the invention which is defined by the following claims.

What is claimed is:

1. An FM demodulation system comprising:

a limiter to which a frequency modulated signal is applied for eliminating amplitude variation in the input frequency modulated signal;

a frequency doubler coupled to the output of said limiter for changing the amplitude limited signal supplied from said limiter into a pulse-train having a frequency which is equal to twice the frequency of said limiter output signal;

a sawtooth-waveform generator coupled to the output of said frequency doubler for generating a signal having a sawtooth-waveform, the amplitudes of which are proportional to time intervals between pulses of said pulse-train;

a low-pass filter coupled to the output of said sawtooth-waveform generator for obtaining an information signal contained in said sawtooth-waveform signal;

an amplitude selector coupled to the output of said sawtooth-waveform generator for producing an output signal when the amplitude of said sawtooth-waveform output exceeds a predetermined level; and a noise suppressing circuit having a first, a second and a third terminal, said first terminal being coupled to the output of said low-pass filter, said second terminal being coupled to the output of said amplitude selector, and said third terminal being an output terminal at which a demodulated output signal is produced, said noise suppressing circuit being controlled according to the application of the selected output from said amplitude selector so as to prevent appearance of a noise component at said third terminal.

2. An FM demodulation system as claimed in claim 1, wherein said noise suppressing circuit comprises a gate circuit coupled between said first terminal and said third terminal thereof, said second terminal of said noise suppressing circuit being a gate circuit control terminal, and a gate pulse generator coupled between said control terminal and said amplitude selector, said gate circuit receiving a gate pulse for controlling the operation thereof so as to prevent said information signal applied at said first terminal from passing to said third terminal, and said gate pulse generator generating said gate pulse having a suitable pulse-width in accordance with the output from said amplitude selector.

3. An FM demodulation system as claimed in claim 1, wherein said noise suppressing circuit comprises a gate circuit coupled to said first terminal thereof, said second terminal of said noise suppressing circuit being a gate control terminal to which a gate pulse for controlling the operation thereof is applied and operating so as to prevent said information signal applied at said first terminal from passing to an output terminal thereof; a gate pulse generator which is coupled between said control terminal and said amplitude selector for generating said gate pulse having a suitable pulse-width in accordance with the output from said amplitude selector; a variable filter coupled between the output of said gate circuit and said third terminal, said variable filter having a control terminal to which a switching pulse for controlling the cutoff frequency thereof is applied; and an integrating circuit which is coupled between said gate pulse output of said gate pulse generator and the control terminal of said variable filter for generating said switching pulse for said variable filter when the voltage which is obtained by integrating said gate pulse output reaches a predetermined value.

* * * * *